United States Patent [19]
Teuber et al.

[11] 3,925,449
[45] Dec. 9, 1975

[54] DIMERIC CHLOROACETONITRILE AND METHOD FOR MAKING THE SAME

[76] Inventors: Hans-Joachin Teuber, Fichtenstr. 13, D 6242 Kronberg; Günther Schutz, Konigsteiner Str. 32 A, D 623 Frankfurt-Hochst, both of Germany

[22] Filed: June 18, 1974

[21] Appl. No.: 480,369

[30] Foreign Application Priority Data
June 23, 1973 Germany............................ 2332024

[52] U.S. Cl..... 260/465.5 R; 260/247.5 R; 260/287; 260/293.87; 260/294.9; 260/326.85; 424/210; 424/304

[51] Int. Cl.²................ C07C 120/00; C07C 121/42
[58] Field of Search............................ 260/465.5 R

[56] References Cited
UNITED STATES PATENTS

| | | | |
|---|---|---|---|
| 3,475,481 | 10/1969 | Krespan...................... | 260/465.5 R |
| 3,759,976 | 9/1973 | Jutz et al..................... | 260/465.5 R |

*Primary Examiner*—Joseph P. Brust
*Attorney, Agent, or Firm*—Curtis, Morris & Safford

[57] ABSTRACT

$\alpha,\gamma$-dichloro-$\beta$-amino-crotonic acid nitrile, a method for making the same by dimerization of chloroacetonitrile in the presence of a Grignard reagent and reaction products thereof with amines.

2 Claims, No Drawings

DIMERIC CHLOROACETONITRILE AND METHOD FOR MAKING THE SAME

It is well known that acetonitrile and substituted acetonitriles can be dimerised by means of a Grignard reaction [cf. G. A. Reynolds et al., J. org. Chem. 16 165 (1951)]. For acetonitriles substituted by halogen atoms such dimers are hitherto unknown.

The present invention relates to α,γ-dichloro-β-amino-crotonic-acid-nitrile of the formula

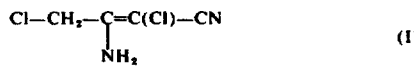

and to a method for making the same. The method is characterized in that one dimerises chloroacetonitrile ($ClCH_2CN$) in presence of a Grignard reagent. The invention further relates to amines and ammonium salts (II and III, respectively)

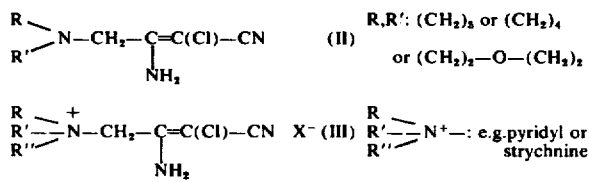

prepared by substitution of the primary halogen atom of (I) by amines, for instance by piperidine, pyrrolidine, morpholine, strychnine, or pyridine.

As Grignard reagents for the preparation of (I), the usually used reagents which do not attack the nitrile group are suitable, especially pentafluoro-phenyl-magnesium-bromide or magnesium-diisopropylamide-bromide (DIPAM). Generally, one uses an amount of ca. 0.5 mole per mole of chloroacetonitrile.

The α,γ-dichloro-β-amino-crotonic-acid-nitrile prepared according to the invention is a valuable, highly reactive intermediate which is able to undergo numerous transformations. For instance, one can prepare valuable acaricides or insecticides by methods well-known per se if one allows the dimeric chloroacetonitrile to react with active derivatives of phosphoric and phosphonic acid esters. Also other nucleophilic reagents, for instance amines and the anions of CH-acidic compounds, are able to substitute the terminal halogen atom of (I). The reaction products, thus obtained, are of pharmacological interest. They are also valuable intermediates for further syntheses, namely for products which can not, or can only difficultly, be obtained otherwise.

It is very surprising that the dimer of the invention can be obtained by the Grignard reaction, since one had to expect that the halogen would react primarily according to the equation:

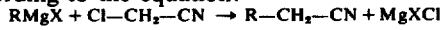

The dimeric chloroacetonitrile (I) operates physiologically as a skin irritating and lachrimatory agent, working only by direct contact of its solutions.

Fading away of the irritating power without harm and the ease of decontamination by transformation to other non-irritating products allow the dimeric chloroacetonitrile to be used for purposes of the police, especially, since the effect can be localized without undesired spreading.

EXAMPLE 1

A solution of 2.8 g chloroacetonitrile in 10 ccm ether is added dropwise to a Grignard solution prepared from 9.2 g pentafluorobromobenzene and 1.2 g magnesium in 20 ccm ether (stirring, reflux condenser). After the end of the reaction, one pours the solution on ice, adds an excess of ammonium chloride, and extracts with ether. After evaporation, one obtains 1.9 g (68%) of yellow crystals which are chromatographed in chloroform on silica gel. The residue of the evaporated eluate may still be slightly colored and can be further purified by briefly heating in carbon tetrachloride deposits with neutral alumina. The filtered solution on cooling rectangular leaflets of mp. 53°–54°C.

Analysis: $C_4H_4N_2Cl_2$ (151.0). Calc.: C 31.8, H 2.65, N 18.6 %. Found.: C 31.4, H 2.42, N 18.5 %.

Soluble in benzene, chloroform, ethanol and methanol. Slightly soluble in cold, better in hot, carbon tetrachloride. Nearly insoluble in petroleum ether.

EXAMPLE 2

In a four-necked round bottom flask, a Grignard solution is prepared from 6 g of magnesium, 60 ccm of absolute diethylether, and 18.6 ccm of ethylbromide in 70 ccm ether. After dilution with 50 ccm ether, adding 34.6 ccm diisopropylamine in 30 ccm ether, stirring for 2 hours, and diluting with 50 ccm of ether, one adds 32 ccm of chloroacetonitrile in 60 ccm of ether. After heating for 4 hours, the run is cooled in ice and decomposed by slowly adding 30 g of ammonium chloride in 100 ccm of water. After stirring (1 hour) and standing over night, the ether/water phase is decanted from undissolved material which is repeatedly treated with ether or with chloroform or carbon tetrachloride (after filtering off). The organic layers, washed with water and dried, yield a dark red oil which crystallizes on seeding: 26 g of compound (I). It is purified from 150 ccm of boiling carbon tetrachloride in the presence of "Frankonit KL", a bleaching Fuller's earth, to give 18 g of transparent plates, mp. 57°C. The yield can be up to 80%.

We claim:
1. α,γ-dichloro-β-amino-crotonic acid nitrile.
2. The method of making the compound of claim 1 which comprises dimerizing chloroacetonitrile by contacting it with about 0.5 mol, per mol of chloroacetonitrile, of a Grignard reagent.

* * * * *